United States Patent [19]

Hsu et al.

[11] Patent Number: 4,505,998
[45] Date of Patent: Mar. 19, 1985

[54] ALKALINE BATTERY CONTAINING A SEPARATOR OF A CROSS-LINKED COPOLYMER OF VINYL ALCOHOL AND UNSATURATED CARBOXYLIC ACID

[75] Inventors: Li-Chen Hsu, Westlake; Warren H. Philipp, N. Olmsted; Dean W. Sheibley, Sandusky; Olga D. Gonzalez-Sanabria, N. Olmsted, all of Ohio

[73] Assignee: The United States of America as represented by the Administrator of the National Aeronautics and Space Administration, Washington, D.C.

[21] Appl. No.: 282,298

[22] Filed: Jul. 10, 1981

[51] Int. Cl.³ ............................................. H01M 6/04
[52] U.S. Cl. .................................... 429/206; 429/249
[58] Field of Search ............... 429/249, 254, 250, 251, 429/252, 206

[56] References Cited

U.S. PATENT DOCUMENTS

| | | | |
|---|---|---|---|
| 4,109,066 | 8/1978 | Dick et al. | 429/254 X |
| 4,157,423 | 6/1979 | Gadessand | 429/249 X |
| 4,277,572 | 7/1981 | Fujiwara et al. | 429/249 X |
| 4,287,275 | 9/1981 | Davis | 429/254 X |
| 4,290,833 | 9/1981 | Kadija et al. | 429/249 X |

*Primary Examiner*—Charles F. LeFevour
*Attorney, Agent, or Firm*—Norman T. Musial; John R. Manning; James A. Mackin

[57] ABSTRACT

A battery separator for an alkaline battery. The separator comprises a cross-linked copolymer of vinyl alcohol units and unsaturated carboxylic acid units. The cross-linked copolymer is insoluble in water, has excellent zincate diffusion and oxygen gas barrier properties and a low electrical resistivity. Cross-linking with a polyaldehyde cross-linking agent is preferred.

1 Claim, 1 Drawing Figure

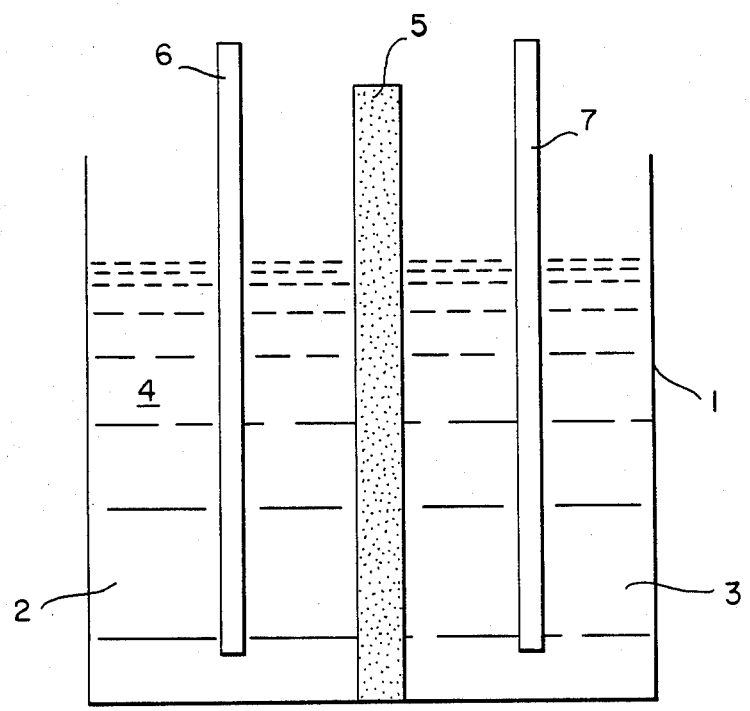

1

ALKALINE BATTERY CONTAINING A SEPARATOR OF A CROSS-LINKED COPOLYMER OF VINYL ALCOHOL AND UNSATURATED CARBOXYLIC ACID

ORIGIN OF THE INVENTION

The invention described herein was made by employees of the U.S. Government and may be manufactured and used by or for the Government without the payment of any royalties thereon or therefor.

FIELD OF THE INVENTION

The present invention relates to a battery separator for an alkaline battery containing an alkaline electrolyte, and positive and negative electrodes. The battery separator is positioned between the electrodes.

BACKGROUND OF THE INVENTION

This invention relates to alkaline batteries. More particularly, the invention relates to separators for alkaline batteries. Still more particularly, the invention relates to such separators which comprise cross-linked polyvinyl alcohol copolymers.

Alkaline batteries are well known and are described in considerable detail in the literature, including U.S. Pat. No. 2,635,127 of Yardney et al; U.S. Pat. No. 2,648,717 of Ross et al; U.S. Pat. No. 4,269,869 of Mendelsohn; and U.S. Pat. No. 4,157,423 of Gaddesaud, the disclosure of each of which is incorporated herein by reference.

One of the key items of an alkaline battery is the separator, a membrane which is interposed between the electrodes of the battery and which is in contact with the alkaline electrolyte. Battery separators are discussed at some length in the foregoing patents and elsewhere, including the following patents: U.S. Pat. No. 4,085,241 of Sheibley; U.S. Pat. No. 4,154,912 of Philipp et al.; and U.S. Pat. No. 4,224,393 of Fienberg et al., the disclosure of each of which is incorporated herein by reference.

One type of battery separator which has received considerable attention, and which is referred to in several of the foregoing patents, comprises cross-linked polyvinyl alcohol. These separators are typically made by casting an aqueous solution containing 5-20% by weight of film-forming polyvinyl alcohol into a film, and drying and cross-linking the film. Cross-linking may be achieved in any of several ways, such as by treatment of the polyvinyl alcohol film with an acid solution of an aldehyde cross-linking agent. Suitable methods include those disclosed in U.S. Pat. No. 4,157,423 of Gaddesaud; U.S. application Ser. No. 145,271, now U.S. Pat. No. 4,272,470 of Hsu et al; and U.S. Pat. No. 4,262,067 of Philipp et al., the disclosure of each of which is incorporated herein by reference.

While the cross-linked polyvinyl alcohol battery separators known heretofore have proven to be satisfactory, there is a continuing need for improvement, particularly in battery performance. It is an object of the present invention to provide a battery having a battery separator which enhances alkaline battery performance and to provide alkaline batteries with enhanced performance.

BRIEF SUMMARY OF THE INVENTION

The foregoing and other objects which will be apparent to those of ordinary skill in the art are achieved in accordance with the present invention by providing, in a battery comprising an alkaline electrolyte, a negative electrode, a positive electrode, and a separator interposed between the electrodes, a separator comprising a cross-linked copolymer comprising 1 to 99 mole % vinyl alcohol units and from 99 to 1 mole % carboxylic acid units.

DESCRIPTION OF THE DRAWING

The drawing is a diagrammatic illustration of an alkaline battery.

DESCRIPTION OF PREFERRED EMBODIMENTS

With reference to the drawing, a conventional alkaline battery includes a casing 1 comprising a positive electrode chamber 2 and a negative electrode chamber 3. An alkaline electrolyte 4 is contained within the casing. A battery separator 5 is interposed between a positive electrode 6 and a negative electrode 7. Electrical leads may be connected to the electrodes for communication with an external electrical circuit.

According to the invention, the separator comprises a cross-linked copolymer comprising from 1 to 99 mole % of vinyl alcohol units and 10-50 mole % unsaturated carboxylic acid units. A separator of this composition has excellent oxygen gas barrier and zincate barrier properties and a low electrical resistivity. The cross-linked copolymer is also insoluble in boiling water.

The copolymer may be prepared by reacting an appropriate ratio of vinyl ester and unsaturated carboxylic acid or an ester or anhydride thereof. The vinyl ester may be 99-1 mole % of the ingredients, but is preferably 90-50 mole %. The carboxylic acid may be 1-99 mole %, but is preferably 10-50 mole % of the mix. Still more preferably, the mole ratio of vinyl alcohol to carboxylic acid is 3-7:1. The resulting vinyl ester-unsaturated carboxylic acid copolymer is hydrolyzed to the desired vinyl alcohol-unsaturated carboxylic acid copolymer. The vinyl alcohol-unsaturated carboxylic acid copolyner is a film-former and preferably has a molecular weight in excess of 50,000.

In order to produce a battery separator, a film is cast from an aqueous solution of the copolymer. After drying, the film is cross linked in any suitable manner. Cross linking with a polyaldehyde, in acidic medium, is preferred. Cross linking of the copolymer makes it insoluble in water and the cross linked copolymer has excellent oxygen gas and zincate barrier properties, low electrical resistivity, and high electrolyte retention capabilities, making it ideal for use as an alkaline battery separator.

Cross linking may be effected chemically by mixing the aqueous copolymer with a known cross-linking agent, such as those described in U.S. Pat. No. 4,640,734 of Oppenheimer et al.; U.S. Pat. No. 4,154,912 of Philipp et al.; or U.S. Pat. No. 4,262,067 of Philipp et al., before casting a film. Alternatively, the copolymeric film may be cross-linked by exposure to irradiation with accelerated electrons. The dried film may be submersed in acid and then irradiated, or the film may be cast and irradiated while wet.

The following examples illustrate the invention:

EXAMPLE 1

A copolymer of vinyl alcohol and acrylic acid, with molecular weight in excess of 50,000 is prepared as follows:

A solution of 150 ml $H_2O$, 45.5 ml vinyl acetate, 5 ml 5% $K_2S_2O_8$ and 1 gr PVA (88% hydrolyzed) is stirred continuously in a three neck flask. The solution is treated under reflux for 30 minutes. A burette solution is prepared containing 50 ml $H_2O$) 7.6 ml acrylic acid and 5 ml 5% $K_2S_2O_8$. Then, 15 ml of the burette solution is added to the flask to start copolymerization. The rest of the burette solution is added slowly in 15–30 minutes. Reflux follows for four hours. The solution is cooled and the resulting white precipitate is filtered, rinsed and dried. A flask solution is then prepared containing 10 gr of the copolymer and 200 ml $CH_3OH$. Heat is applied and the mix is refluxed for 30 minutes. A burette solution containing 5 gr $CH_3ONa$ and 50 ml $CH_3OH$ is prepared. Initially 15 ml of burette solution is added to the flask, then the rest is added slowly in 15–30 minutes. The solution is neutralized with dilute acid and cooled. The precipitate is filtered, rinsed and dried.

EXAMPLE 2

Cross-linking of the vinyl alcohol-acrylic acid copolymer is effected by mixing 100 gr of a 5% aqueous solution of the copolymer with 0.81 gr glutaraldehyde, 25 gr $H_2O$ and 2 gr Triton×100 solution and heating to 100°–120° C. The solution is put under vacuum and is then cast on a flat surface, such as a glass plate. The film is dried overnight, then heated in an acid solution for one hour at 90° C. The film is then rinsed. The acid solution may comprise 40 ml conc. $H_2SO_4$ and 200 gr $Na_2SO_4$ dissolved in 2 l of water.

EXAMPLE 3

A 5% solution of the vinyl alcohol-acrylic acid copolymer is cast into a film and dried. The film is placed in an acid solution and exposed to a 2 mev accelerator at 10 μa for 10 minutes. The irradiated film is then taken out of the solution, rinsed and dried. Alternatively, a film of a 5% aqueous solution (acid pH) of the copolymer is cast and irradiated while wet at 2 μa for 10 minutes. The film is then dried at room temperature.

Tables 1 and 2 which follow illustrate the properties of battery separators made with various proportions of vinyl alcohol and acrylic alcohol in accordance with the foregoing examples. Table 1 shows area resistivity, volume resistivity, zinc dendrite penetration rate and zincate diffusion rates for varying ratios of vinyl alcohol to carboxylic acid. The copolymer is acid cross-linked with 10% glutaraldehyde. Table 2 shows changes in these same properties as a result of the use of different aldehyde cross-linkers.

TABLE 1

| | Copolymer - 10% GDA* Acid XL | | | |
|---|---|---|---|---|
| Material | Area Resistivity ($\Omega cm^2$) | Resistivity ($\Omega cm$) | Zinc Dendrite Penetration Rate (cm/min) | Zn Diffusion Rate (mole/$cm^2$min) |
| 7VA-1AA** | .062 | 5.276 | $2.975 \times 10^{-3}$ | $1.900 \times 10^{-6}$ |
| 6VA-1AA | .154 | 6.082 | $2.335 \times 10^{-4}$ | $2.572 \times 10^{-6}$ |
| 5VA-1AA | .102 | 3.656 | $4.989 \times 10^{-4}$ | $2.988 \times 10^{-6}$ |
| 4VA-1AA | .110 | 8.619 | $6.479 \times 10^{-4}$ | $1.358 \times 10^{-6}$ |
| 3VA-1AA | .058 | 2.640 | $1.619 \times 10^{-3}$ | |

*Glutaraldehyde cross-linker
**Where XVA-YAA is the molecular units ratio: e.g., 7VA-1AA is 7 vinyl acetate moles per one acrylic acid mole.

TABLE 2

| | Copolymer 6VA-1AA Acid XL | | | | |
|---|---|---|---|---|---|
| Cross-linker | Area Resistivity ($\Omega cm^2$) | Volume Resistivity ($\Omega cm$) | Zinc Dendrite Penetration Rate (cm/min) | $Zn^{+2}$ Diffusion (mole/$cm^2$min) | $OH^-$ Diffusion (mole/$cm^2$min) |
| 10% GDA | .154 | 6.082 | $2.335 \times 10^{-4}$ | $2.572 \times 10^{-6}$ | — |
| 10% TPA* | .031 | 2.820 | $4.45 \times 10^{-4}$ | $9.49 \times 10^{-7}$ | $3.189 \times 10^{-4}$ |
| 10% DAF** | .126 | 14.282 | $2.88 \times 10^{-4}$ | $7.00 \times 10^{-7}$ | $4.083 \times 10^{-4}$ |

*Terephthaldehyde
**Dialdehyde of furan

It will be seen from the table that battery separators in accordance with the present invention have excellent properties such as low electrical resistivity, low zincate diffusion rate, and low zinc dendrite penetration rates. Preferred battery separators in accordance with the present invention have the following properties:

Area Resistivity (ohm-$cm^2$): 1
Volume Resistivity (ohm-cm): 20
Zinc Dendrite Penetration Rate (cm/min): $5 \times 10^{-4}$
Zincate Diffusion Rate (mole/$cm^2$min): $2 \times 10^{-6}$ In the foregoing examples, vinyl acetate and acrylic acid are employed. However, other hydrolyzable esters of vinyl alcohol and other unsaturated carboxylic acids can be used. The copolymers, methods of making them, and suitable monomers are well known. Vinyl acetate is widely used and is the preferred hydrolyzable ester of vinyl alcohol. The copolymerizable acid can vary widely and can be the free acid or an ester thereof or, in the case of polycarboxylic acids, an anhydride thereof. Suitable monomers include: acrylic acid or esters thereof such as methyl acrylate; maleic acid or half of full esters thereof; maleic anhydride; fumaric acid; and itaconic acid.

It will be understood by those having ordinary skill in the art that the copolymer making up a battery separator in accordance with the present invention is made by hydrolyzing and cross linking copolymer made by reacting a vinyl ester, such as vinyl acetate, and an unsaturated carboxylic acid or ester or anhydride thereof. The hydrolyzed copolymer contains hydroxyl groups resulting from the hydrolysis of the polymerized vinyl acetate and carboxylic acid groups which were either present on the saturated carboxylic acid reactant or, where an ester or anhydride of that acid was employed, resulted from the hydrolysis of the polymerized anhydride or ester. It will thus be readily apparent that the copolymer does not contain any vinyl unsaturation since the vinyl acetate monomer was polymerized. For this reason, in naming the copolymer, the expression "units" has been used to make it clear that the "vinyl alcohol" portion of the copolymer does not contain vinyl unsaturation. Similarly, where a mono-unsaturated carboxylic acid, ester or anhydride monomer is copolymerized with the vinyl ester, the resulting copolymer contains no unsaturation in that portion of the copolymer derived from the mono-unsaturated carboxylic acid, ester, or anhydride. Accordingly, the term "units" has been used to make it clear that the carboxylic acid portion of the copolymer does not necessarily contain any unsaturation.

What is claimed is:

1. In an alkaline battery comprising an alkaline electrolyte, a positive electrode, a negative electrode, and a separator interposed between said electrodes and permeated by said electrolyte but substantially impermeable to gaseous oxygen, the improvement wherein said separator comprises a cross-linked copolymer comprising from 1 to 99 mole % vinyl alcohol units and from 99 to 1 mole % carboxylic acid units and wherein said crosslinked copolymer is formed by reacting a vinyl ester and an unsaturated carboxylic acid, or ester or anhydride thereof to form a vinyl ester-carboxylic acid or ester copolymer, followed by hydrolysis to form a vinyl alcohol-carboxylic acid copolymer, and wherein said vinyl alcohol-carboxylic acid copolymer is subsequently cross-linked.

* * * * *